United States Patent
Iwai

(10) Patent No.: US 9,980,172 B2
(45) Date of Patent: May 22, 2018

(54) MTC-IWF ENTITY, SCS ENTITY, PCRF ENTITY, AND COMMUNICATION METHOD

(71) Applicant: NEC CORPORATION, Tokyo (JP)

(72) Inventor: Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 72 days.

(21) Appl. No.: 14/912,944

(22) PCT Filed: Jun. 6, 2014

(86) PCT No.: PCT/JP2014/003020
§ 371 (c)(1),
(2) Date: Feb. 19, 2016

(87) PCT Pub. No.: WO2015/025444
PCT Pub. Date: Feb. 26, 2015

(65) Prior Publication Data
US 2016/0212652 A1     Jul. 21, 2016

(30) Foreign Application Priority Data

Aug. 22, 2013 (JP) ................................. 2013-172653

(51) Int. Cl.
*H04W 28/02* (2009.01)
*H04W 4/00* (2018.01)
(Continued)

(52) U.S. Cl.
CPC ......... *H04W 28/0215* (2013.01); *H04L 41/04* (2013.01); *H04L 43/0817* (2013.01);
(Continued)

(58) Field of Classification Search
CPC . H04W 28/0215; H04W 4/005; H04W 48/14; H04L 12/1407; H04L 12/1435; H04L 41/04; H04L 43/0817; H04L 47/2466
See application file for complete search history.

(56) References Cited

U.S. PATENT DOCUMENTS

| 9,392,583 | B2 * | 7/2016 | Xiong ................... H04W 24/02 |
| 2012/0176894 | A1 * | 7/2012 | Cai .......................... H04L 47/11 370/230 |

(Continued)

FOREIGN PATENT DOCUMENTS

| JP | 2012-151803 A | 8/2012 |
| WO | 2012/083795 A1 | 6/2012 |

OTHER PUBLICATIONS

"System improvements for Machine-Type Communications" (MTC), (Release 11), 3GPP TR 23.888 V11.0.0 (Sep. 2012).

(Continued)

*Primary Examiner* — Chi H Pham
*Assistant Examiner* — Weibin Huang
(74) *Attorney, Agent, or Firm* — Sughrue Mion, PLLC

(57) ABSTRACT

A MTC-IWF entity (1) includes a messaging unit (101). The messaging unit (101) operates to receive a control message including first load information from a PCRF (60) through a signaling interface between the PCRF (60) and the MTC-IWF entity (1). The first load information indicates a load status of a user plane or a control plane in a GGSN (57), an S-GW (58), or a P-GW (57). It is thus possible, for example, to facilitate collecting, by an MTC-IWF or an SCS, load information regarding a PLMN.

7 Claims, 14 Drawing Sheets

(51) Int. Cl.
  *H04W 48/14*   (2009.01)
  *H04L 12/24*   (2006.01)
  *H04L 12/26*   (2006.01)
  *H04W 88/16*   (2009.01)
  *H04L 12/801*  (2013.01)
  *H04W 84/04*   (2009.01)

(52) U.S. Cl.
  CPC ........... *H04W 4/005* (2013.01); *H04W 48/14* (2013.01); *H04L 41/0893* (2013.01); *H04L 41/147* (2013.01); *H04L 43/028* (2013.01); *H04L 47/12* (2013.01); *H04L 47/127* (2013.01); *H04W 84/042* (2013.01); *H04W 88/16* (2013.01)

(56) References Cited

U.S. PATENT DOCUMENTS

| | | |
|---|---|---|
| 2012/0190326 A1 | 7/2012 | Mizusawa |
| 2013/0042011 A1* | 2/2013 | Sugizaki ............... H04W 4/005 709/227 |
| 2014/0134996 A1* | 5/2014 | Barclay ................. H04W 24/08 455/422.1 |
| 2015/0189539 A1* | 7/2015 | Li .......................... H04W 28/24 370/230 |
| 2015/0201394 A1* | 7/2015 | Qu ........................... H04W 4/02 455/456.1 |
| 2016/0112896 A1* | 4/2016 | Karampatsis ..... H04W 28/0252 370/230.1 |
| 2016/0359750 A1* | 12/2016 | Miklos .................... H04L 47/24 |

OTHER PUBLICATIONS

Huawei, Hisilicon, "Proposed reference architecture for monitoring", 3GPP TSG-SA WG2 #93 S2-124131, Oct. 8, 2012.

"Architecture enhancements to facilitate communications with packet data networks and applications" (Release 11), 3GPP TS 23.682 V11.3.0 (Dec. 2012).

International Search Report for PCT/JP2014/003020 dated Sep. 9, 2014.

* cited by examiner

MTC-IWF ENTITY, SCS ENTITY, PCRF ENTITY, AND COMMUNICATION METHOD

CROSS REFERENCE TO RELATED APPLICATIONS

This application is a National Stage of International Application No. PCT/JP2014/003020 filed Jun. 6, 2014, claiming priority based on Japanese Patent Application No. 2013-172653 filed Aug. 22, 2013, the contents of all of which are incorporated herein by reference in their entirety.

TECHNICAL FIELD

This application relates to a Universal Mobile Telecommunications System (UMTS) and an Evolved Packet System (EPS) that support Machine Type Communication (MTC).

BACKGROUND ART

The Third Generation Partnership Project (3GPP) has examined the standardization of the MTC. The MTC is also called a Machine-to-Machine (M2M) network or a sensor network. The 3GPP defines mobile stations (MSs, USs) implemented in machines and sensors for the MTC as "MTC devices". The MTC devices are typically arranged in various types of equipment including machines (e.g., vending machines, gas meters, electric meters, vehicles, railway vehicles) and sensors (e.g., environmental, agricultural, or traffic sensors). The MTC devices are connected to a Public Land Mobile Network (PLMN) and communicate with an MTC application server (AS). The MTC application server is arranged outside the PLMN (external network), executes an MTC application, and communicates with MTC UE applications implemented in the MTC devices. The MTC application server is typically controlled by an MTC service provider (M2M service provider).

The 3GPP specifies network elements including a Service Capability Server (SCS) and a Machine Type Communication Inter Working Function (MTC-IWF), reference points, and procedures to allow the MTC application server to communicate with the MTC devices (see Non-patent literature 1). The reference points are also called as "interfaces".

The SCS is an entity to connect the MTC application server to the 3GPP PLMN and to allow the MTC application server to communicate with a UE (i.e., MTC device) through a PLMN service defined by the 3GPP. Further, the SCS allows the MTC application server to communicate with the MTC-IWF. The SCS is assumed to be controlled by an operator of the PLMN or the MTC service provider.

The MTC-IWF is a control-plane entity that belongs to the PLMN. The MTC-IWF has a signaling interface (reference point) with the SCS and has connections with nodes in the PLMN (e.g., Home Subscriber Server (HSS), a Short Message Service-Service Center (SMS-SC), a Serving GPRS Support Node (SGSN), a Mobility Management Entity (MME), and a Mobile Switching Center (MSC)). The MTC-IWF serves as a control-plane interface to allow the 3GPP PLMN and the M2M service layer including the SCS to cooperate (interwork) with each other while hiding the details of the topology of the 3GPP PLMN.

CITATION LIST

Non Patent literature

[Non Patent Literature 1] 3GPP TS 23.682 V11.3.0 (2012-12) "3rd Generation Partnership Project; Technical Specification Group Services and System Aspects; Architecture enhancements to facilitate communications with packet data networks and applications (Release 11)", December 2012

SUMMARY OF INVENTION

Technical Problem

The inventor has examined various use cases of the MTC application. For example, it is contemplated that information (e.g., load information) related to a Public Land Mobile Network (PLMN) be provided from the PLMN to an MTC service client (i.e., SCS administrator, MTC application server administrator, or MTC service provider). Further, for example, it is contemplated that a charging policy (e.g., charge) related to the MTC service be determined in accordance with the load status of the PLMN. In order to implement these use cases, for example, it is preferable that the MTC-IWF or the SCS can obtain the load status of either a user plane or a control plane or both through a signaling interface (reference point) with a network element within the PLMN. However, Non-patent literature 1 does not teach that the MTC-IWF or the SCS collects the load status of the user plane or control plane of the PLMN. Accordingly, there is a possibility that the signaling interfaces (reference points) of the MTC-IWF or the SCS defined in Non-patent literature 1 or information transferred through these signaling interfaces is insufficient for the MTC-IWF or the SCS to collect the load information regarding the user plane or control plane of the PLMN.

The present invention has been made based on the above-described findings of the inventor, and one object of the present invention is to provide an MTC-IWF entity, an SCS entity, a PCRF entity, a communication method, and a program for facilitating collecting, by the MTC-IWF or the SCS, load information regarding the PLMN.

Solution to Problem

In a first aspect, an MTC-IWF entity includes a messaging unit. The messaging unit operates to receive a control message including first load information from a Gateway General Packet Radio Service Support Node (GGSN), a Serving Gateway (S-GW), or a Packet Data Network Gateway (P-GW) through a signaling interface between the MTC-IWF entity and the GGSN, the S-GW, or the P-GW. The first load information indicates a load status of a user plane or a control plane in the GGSN, the S-GW, or the P-GW.

In a second aspect, a communication method includes receiving, by an MTC-IWF entity, a control message including first load information from a GGSN, an S-GW, or a P-GW through a signaling interface between the MTC-IWF entity and the GGSN, the S-GW, or the P-GW. The first load information indicates a load status of a user plane or a control plane in the GGSN, the S-GW, or the P-GW.

In a third aspect, an MTC-IWF entity includes a messaging unit. The messaging unit operates to receive a control message including first load information from an SGSN or an MME through a signaling interface between the MTC-IWF entity and the SGSN or the MME. The first load information indicates a load status of a user plane or a control plane in a GGSN, an S-GW, or a P-GW.

In a fourth aspect, a communication method includes receiving, by an MTC-IWF entity, a control message including first load information from an SGSN or an MME through a signaling interface between the MTC-IWF entity and the SGSN or the MME. The first load information indicates a load status of a user plane or a control plane in a GGSN, an S-GW, or a P-GW.

In a fifth aspect, an MTC-IWF entity includes a messaging unit. The messaging unit operates to receive a control message including first load information from a Policy and Charging Rule Function (PCRF) through a signaling interface between the PCRF and the MTC-IWF entity. The first load information indicates a load status of a user plane or a control plane in a GGSN, an S-GW, or a P-GW.

In a sixth aspect, a communication method includes receiving, by an MTC-IWF entity, a control message including first load information from a PCRF through a signaling interface between the PCRF and the MTC-IWF entity. The first load information indicates a load status of a user plane or a control plane in a GGSN, an S-GW, or a P-GW.

In a seventh aspect an SCS entity includes a first messaging unit and a second messaging unit. The first messaging unit operates to communicate with an MTC-IWF entity through a first signaling interface between the MTC-IWF and the SCS entity. The second messaging unit operates to receive a control message including first load information from a GGSN, an S-GW, or a P-GW through a signaling interface between the MTC-IWF entity and the GGSN, the S-GW, or the P-GW. The first load information indicates a load status of a user plane or a control plane in the GGSN, the S-GW, or the P-GW.

In an eighth aspect, a communication method includes: (a) communicating, by an SCS entity, with an MTC-IWF entity through a first signaling interface between the MTC-IWF and the SCS entity; and (b) receiving, by the SCS entity, a control message including first load information from a GGSN, an S-GW, or a P-GW through a signaling interface between the MTC-IWF entity and the GGSN, the S-GW, or the P-GW. The first load information indicates a load status of a user plane or a control plane in the GGSN, the S-GW, or the P-GW.

The ninth aspect, a PCRF entity includes a control unit and a messaging unit. The control unit operates to supply a Policy and Charging Control (PCC) rule to a GGSN or a P-GW serving as a Policy and Charging Enforcement Function (PCEF). The messaging unit operates to transmit load information to an SCS or an application server. The load information indicates a load status of a user plane or a control plane in the GGSN, the P-GW, or an S-GW.

In a tenth aspect, a SCS entity includes a first messaging unit and a second messaging unit. The first messaging unit operates to communicate with an MTC-IWF entity through a first signaling interface between the MTC-IWF and the SCS entity. The second messaging unit operates to receive a control message including load information from a PCRF through a second signaling interface between the PCRF and the SCS entity. The load information indicates a load status of a user plane or a control plane in a GGSN, an S-GW, or a P-GW.

In an eleventh aspect, a communication method includes: (a) supplying, by a PCRF, a Policy and Charging Control (PCC) rule to a GGSN or a P-GW serving as a PCEF; and (b) transmitting, by the PCRF, load information to an SCS or an application server. The load information indicates a load status of a user plane or a control plane in the GGSN, the P-GW, or an S-GW.

In a twelfth aspect, a communication method includes: (a) communicating, by an SCS entity, with an MTC-IWF entity through a first signaling interface between the MTC-IWF and the SCS entity; and (b) receiving, by the SCS entity, a control message including load information from a PCRF through a second signaling interface between the PCRF and the SCS entity. The load information indicates a load status of a user plane or a control plane in a GGSN, an S-GW, or a P-GW.

In a thirteenth aspect, an MTC-IWF entity includes a messaging unit. The messaging unit operates to receive a control message including first load information from a SGSN or an MME through a signaling interface between the MTC-IWF and the SGSN or the MME. The first load information indicates a load status of the SGSN or the MME.

In a fourteenth aspect, a communication method includes receiving, by an MTC-IWF entity, a control message including first load information from a SGSN or an MME through a signaling interface between the MTC-IWF and the SGSN or the MME. The first load information indicates a load status of the SGSN or the MME.

In a fifteenth aspect, an MTC-IWF entity includes a messaging unit. The messaging unit operates to receive a control message including first load information from a Traffic Detection Function (TDF) through a signaling interface between the TDF and the MTC-IWF. The first load information indicates a load status of a user plane or a control plane in a GGSN, an S-GW, or a P-GW.

In a sixteenth aspect, a communication method includes receiving, by an MTC-IWF entity, a control message including first load information from a Traffic Detection Function (TDF) through a signaling interface between the TDF and the MTC-IWF. The first load information indicates a load status of a user plane or a control plane in a GGSN, an S-GW, or a P-GW.

In a seventeenth aspect, a program includes instruction for causing a computer to perform the communication method according to the second, fourth, sixth, eighth, eleventh, twelfth, fourteenth, or sixteenth aspect.

Advantageous Effects of Invention

According to the aspects stated above, it is possible to provide an MTC-IWF entity, an SCS entity, a PCRF entity, a communication method, and a program for facilitating collecting, by the MTC-IWF or the SCS, load information regarding the PLMN.

DESCRIPTION OF EMBODIMENTS

Figure 1:
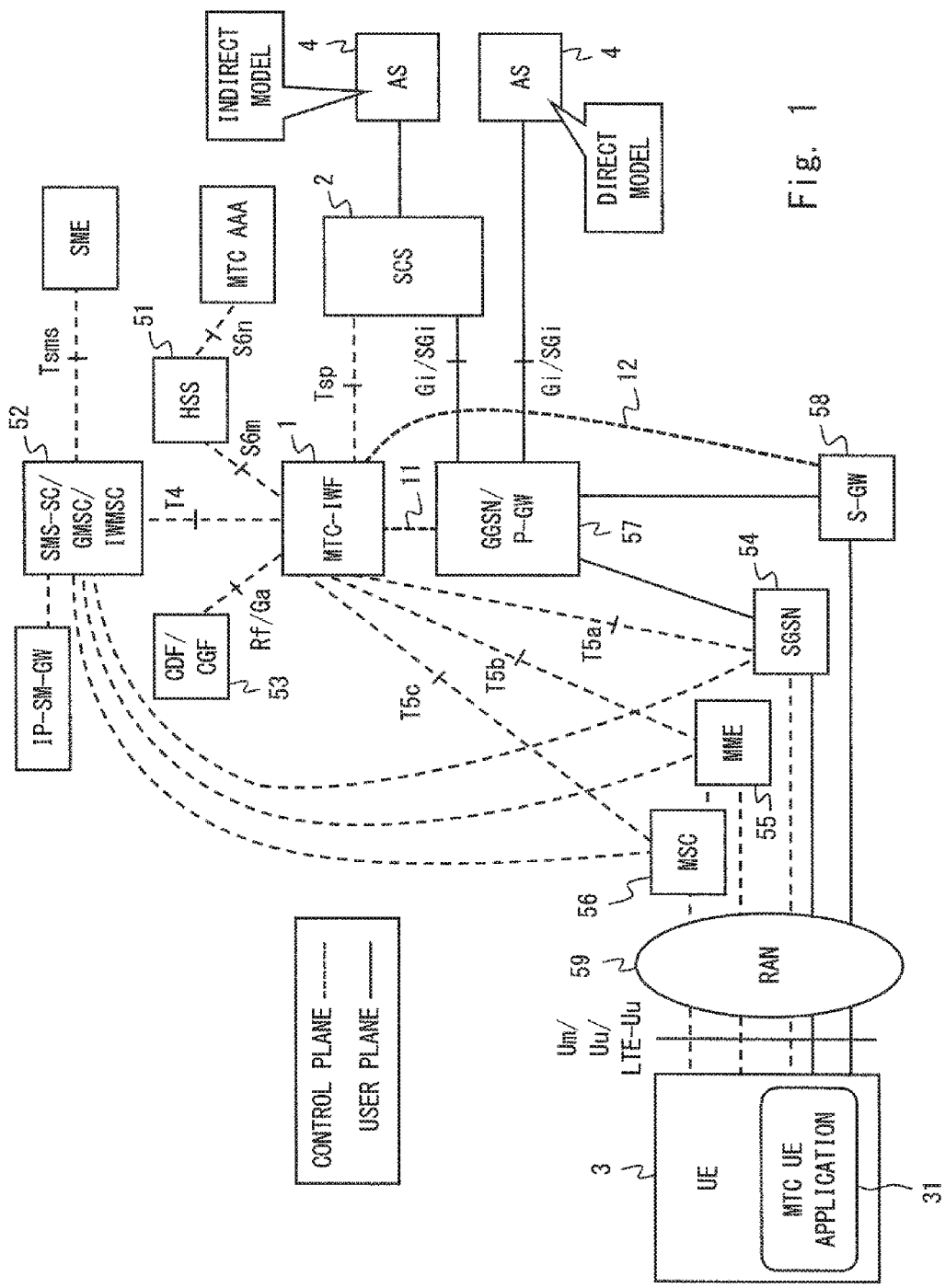
FIG. 1 is a diagram showing a radio communication system including a MTC-IWF entity according to a first embodiment that performs a procedure for obtaining load information regarding a PLMN.

Specific embodiments will be explained hereinafter in detail with reference to the drawings. The same symbols are assigned to the same or corresponding elements throughout the drawings, and repetitive explanations will be omitted as necessary.
First Embodiment FIG. 1 is a diagram showing a configuration example of a radio communication system according to the embodiment. The radio communication system according to the embodiment is a 3GPP radio communication system, i.e., a UTMS or an EPS. The EPS is also called as a Long Term Evolution (LTE) system.

A UE 3 executes an MTC UE application 31 and serves as an MTC device. The UE 3 as an MTC device is connected to an SGSN 54 or an MME 55 through a Radio Access Network (RAN) 59 and communicates with the MTC application server 4. The UE 3 may be an MTC gateway device. The MTC gateway device has a 3GPP mobile communication function (i.e., functions of a UE) and is connected to an adjacent device (e.g., a sensor, a radio frequency identification (RFID) tag, a car navigation device) by a personal/local area connection technology. Specific examples of the personal/local area connection technology include IEEE 802.15, ZigBee, Bluetooth, and IEEE 802.11a. The adjacent device, which is connected to the MTC gateway device, is typically a device that does not have the 3GPP mobile communication function, but may be a device that has the 3GPP mobile communication function (i.e., an MTC device).

In this description, the term "MTC device" and the term "MTC gateway device" are not particularly distinguished from each other. That is, the term "MTC device" used in this description includes the MTC gateway device. Therefore, the UE 3 as the MTC device also means the UE 3 as the MTC gateway device.

An MTC-IWF entity 1 is a control-plane entity that belongs to the PLMN. The MTC-IWF entity 1 communicates with other network elements through signaling interfaces (reference points). The MTC-IWF entity 1 serves as a control-plane interface or gateway to allow a 3GPP PLMN and an M2M service layer including an SCS 2 to cooperate (interwork) with each other while hiding the details of the topology of the 3GPP PLMN. Hereinafter, the signaling interfaces (reference points) of the MTC-IWF entity 1 and the other network elements will be described.

The MTC-IWF entity 1 communicates with the SCS 2 through a Tsp reference point. The SCS 2 connects the MTC application server 4 to the PLMN and allows the MTC application server 4 to communicate with the UE 3 (i.e., MTC device) through the PLMN service defined by the 3GPP. Further, the SCS 2 allows the MTC application server 4 to communicate with the MTC-IWF entity 1. The SCS 2 is controlled by an operator of the PLMN or by an MTC service provider. The SCS 2 is also referred to as an MTC server or an M2M server. The SCS 2 may be a single, stand-alone physical entity or may be a functional entity added to another network element (e.g., MTC application server 4). The Tsp reference point is used, for example, to transmit a device trigger transmission request (Device Trigger Request (DTR)) from the SCS 2 to the MTC-IWF entity 1 and to report a device trigger result from the MTC-IWF entity 1 to the SCS 2.

The MTC-IWF entity 1 communicates with an HSS 51 through an S6m reference point. The HSS 51 is a control-plane node arranged in a core network of the PLMN and manages subscriber information of the UE 3. The S6m reference point is used, for example, to send an inquiry as to the subscriber information from the MTC-IWF entity 1 to the HSS 51 and to transmit the subscriber information from the HSS 51 to the MTC-IWF entity 1.

The MTC-IWF entity 1 communicates with an SMS-SC 52 through a T4 reference point. The SMS-SC 52 transmits short messages of a Mobile Terminated (MT) direction to the UE 3 through the SGSN 54, the MME 55, or an MSC 56, and receives short messages of a Mobile Originated (MO) direction from the UE 3. The T4 interface is used, for example, to transmit a device trigger transmission request (i.e., short message transmission request) from the MTC-IWF entity 1 to the SMS-SC 52 and to transmit a confirmation message from the SMS-SC 52 to the MTC-IWF entity 1.

The MTC-IWF entity 1 communicates with a Charging Data Function (CDF)/Charging Gateway Function (CGF) 53 through an Rf reference point or a Ga reference point. The CDF included in the CDF/CGF 53 receives charging information regarding a chargeable event generated by a Charging Trigger Function (CTF) through the Rf reference point, and generates a Charging Data Record (CDR) for each predetermined charged party. Further, the CGF included in the CDF/CGF 53 receives the CDR from the CDF through the Ga reference point and transmits the CDR to a charging system. The chargeable event means an activity that uses resources or services served by the communication network. The chargeable event, for example, is a user to user communication (e.g., a single call, a data communication session, or a short message), a user to network communication (e.g., service profile administration), an inter-network communication (e.g., transferring calls, signaling, or short messages), or a mobility (e.g., roaming or inter-system handover). The CDR means formatted charging information (e.g., call time, data transfer amount, etc.). The MTC-IWF entity 1 includes, for example, the CTF or the CTF and CDF. The CTF (not illustrated) arranged in the MTC-IWF entity 1 sends the charging information to the CDF/CGF 53 through the Rf reference point. Further, the CDF (not illustrated) arranged in the MTC-IWF entity 1 sends the CDR to the CDF/CGF 53 through the Ga reference point.

The MTC-IWF entity 1 communicates with the SGSN 54 through a T5*a* reference point. The SGSN 54 is a core-network node in the UMTS and has a user-plane function and a control-plane function. The user plane function of the SGSN 54 has a user-plane tunneling interface (i.e., Iu-PS reference point) with the RAN 59 (i.e., UMTS Terrestrial Radio Access Network (UTRAN)), and also has a user-plane tunneling interface (i.e., Gn reference point) with a Gateway GPRS Support Node (GGSN, i.e., GGSN/P-GW 57). The user-plane function of the SGSN 54 transfers user data packets of the UE 3 between the RAN 59 and the GGSN (GGSN/P-GW 57). The control-plane function of the SGSN 54 carries out mobility management (e.g., position registration) of the UE 3, bearer management (e.g., bearer establishment, bearer configuration modification, and bearer release), and the like. The control-plane function of the SGSN 54 transmits and receives control messages to and from a node (i.e., Radio Network Controller (RNC)) in the RAN 59, and transmits and receives Non-Access Stratum (NAS) messages to and from the UE 3. The NAS messages are control messages that are not terminated at the RAN 59 and are transparently transmitted or received between the UE 3 and the SGSN 54 without depending on the radio access technology used in the RAN. Furthermore, the SGSN 54 operates as a mobility anchor for the user plane during inter-RNC handovers of the UE 3.

The MTC-IWF entity 1 communicates with the MME 55 through a T5*b* reference point. The MME 55 is a core network node in the EPS and carries out the mobility management (e.g., position registration) of the UE 3, the bearer management (e.g., bearer establishment, bearer configuration modification, and bearer release), and the like. The MME 55 transmits and receives a control message to and from a node (i.e., eNodeB) in the RAN 59, and transmits and receives NAS messages to and from the UE 3. The NAS messages are not terminated at the RAN 59 and are transparently transmitted or received between the UE 3 and the MME 55 without depending on the radio access technology used in the RAN.

The MTC-IWF entity 1 communicates with the MSC 56 through a T5*c* reference point. The MSC 56 is a node in a Circuit-Switched (CS) service domain (i.e., Public-Switched Telephone Network (PSTN)/Integrated Services Digital Network (ISDN)) arranged in the core network. The MSC 56 makes a call connection and carries out call control in the CS service domain.

The Tsp, S6m, T4, Rf/Ga, and T5*a*/T5*b*/T5*c* reference points described above are defined in Non-patent literature 1. However, Non-patent literature 1 does not define reference points between the MTC-IWF entity 1 and the GGSN/P-GW 57 and between the MTC-IWF entity 1 and an S-GW 58.

The Gateway GPRS Support Node (GGSN) is a core network node in the UMTS. The Packet Data Network Gateway (P-GW) is a core network node in the EPS. The GGSN/P-GW 57 means either the GGSN or the P-GW or both. The GGSN/P-GW 57 is a user-plane packet-transfer node arranged in the core network of the PLMN and transfers user data packets of the UE 3. The GGSN/P-GW 57 serves as a gateway to an external Packet Data Network (PDN) and provides the UE 3 with the connectivity to the external PDN. Furthermore, GGSN/P-GW 57 includes the Charging Trigger Function (CTF), the Charging Data Function (CDF), and a Policy and Charging Enforcement Function (PCEF).

The GGSN/P-GW 57 serving as the CTF collects the charging information regarding the chargeable event. The GGSN/P-GW 57 serving as the CDF generates the Charging Data Record (CDR) for each predetermined charged party based on the collected charging information.

Furthermore, the GGSN/P-GW 57 serving as the PCEF carries out Quality of Service (QoS) control and Flow Based bearer Charging (FBC) per service data flow (i.e., IP packet flow) of the UE 3 in accordance with a Policy and Charging Control (PCC) rule supplied from a Policy and Charging Rule Function (PCRF, not illustrated). The FBC is implemented by the CTF, the CDF, and the PCEF included in the GGSN/P-GW 57. In other words, the GGSN/P-GW 57 performs filtering on the service data flow of the UE 3, monitors the service data flow as a chargeable event that triggers the generation and close of the CDR, counts the number of packets in the service data flow, and generates the CDR containing the charging information related to the service data flow.

The S-GW 58 is a packet transfer node arranged in a core network in the EPS. The S-GW 58 has a user-plane tunneling interface (i.e., S1-U reference point) between the RAN 59 (i.e., Evolved UTRAN) and the S-GW 58, and also has a user-plane tunneling interface (i.e., S5/S8 reference point) between the P-GW (i.e., GGSN/P-GW 57) and the S-GW 58. The S-GW 58 transfers user data packets of the UE 3 between the RAN 59 and the P-GW (GGSN/P-GW 57). Furthermore, the S-GW 58 operates as a mobility anchor for the user plane during inter-eNodeB handovers of the UE 3.

In the example of FIG. 1, the MTC-IWF entity 1 has a signaling interface (reference point) 11 with the GGSN/P-GW 57. The MTC-IWF entity 1 receives load information regarding the GGSN or the P-GW from the GGSN/P-GW 57 through the signaling interface 11. The load information regarding the GGSN or the P-GW indicates load status of either the user plane or the control plane or both in the GGSN or the P-GW. The load information regarding the GGSN or the P-GW indicates, for example, the number of transferred user data packets, the number of currently established tunnels, the number of currently established bearers, the number of currently retained bearer contexts, or the number of processed control messages.

Figure 2:
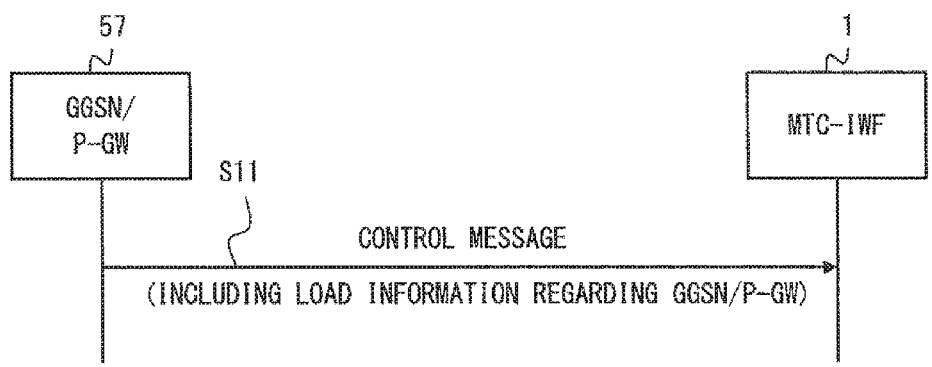
FIG. 2 is a sequence diagram showing an example of the procedure for obtaining the load information regarding the PLMN according to the first embodiment.

FIG. 2 is a sequence diagram showing the procedure for obtaining, by the MTC-IWF entity 1, the load information regarding the GGSN or the P-GW. In step S11, the GGSN/P-GW 57 transmits a control message to the MTC-IWF entity 1 through the signaling interface 11. This control message contains the load information regarding the GGSN or the P-GW.

Furthermore, in the example of FIG. 1, the MTC-IWF entity 1 has a signaling interface (reference point) 12 with the S-GW 58. The MTC-IWF entity 1 receives load information regarding the S-GW 58 from the S-GW 58 through the signaling interface 12. The load information regarding the S-GW 58 indicates load status of either the user plane or the control plane or both in the S-GW 58. The load information regarding the S-GW 58 indicates, for example, the number of transferred user data packets, the number of currently established tunnels, the number of currently established bearers, the number of currently retained bearer contexts, or the number of processed control messages.

Figure 3:
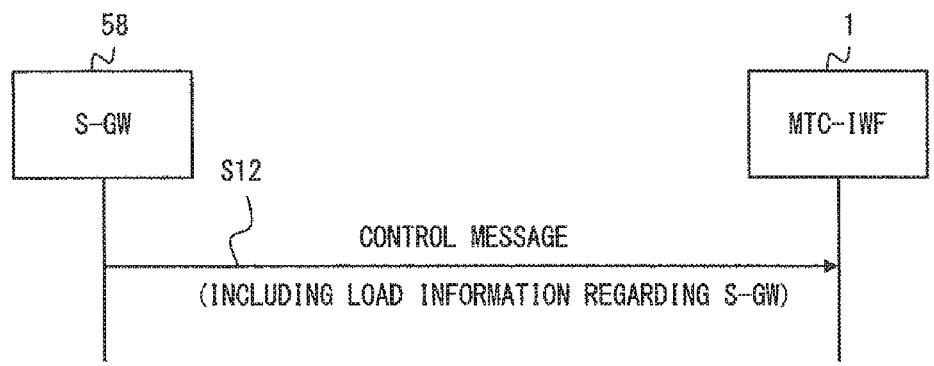
FIG. 3 is a sequence diagram showing an example of the procedure for obtaining the load information regarding the PLMN according to the first embodiment.

FIG. 3 is a sequence diagram showing the procedure for obtaining, by the MTC-IWF entity 1, the load information regarding the S-GW 58. In step S12, the S-GW 58 transmits a control message to the MTC-IWF entity 1 through the signaling interface 12. This control message contains the load information regarding the S-GW 58.

The MTC-IWF entity 1 may have only either the signaling interface 11 or 12. In this case, the MTC-IWF entity 1 may receive the load information regarding only either the GGSN/P-GW 57 or the S-GW 58.

As described above, in the embodiment, the MTC-IWF entity 1 receives the load information regarding either the GGSN/P-GW 57 or the S-GW 58 or both through the signaling interface 11 with the GGSN/P-GW 57 or the signaling interface 12 with the S-GW 58. Accordingly, the MTC-IWF entity 1 can use the load information regarding either the GGSN/P-GW 57 or the S-GW 58 or both. For example, the MTC-IWF entity 1 may use the load information regarding either the GGSN/P-GW 57 or the S-GW 58 or both to provide an additional service.

The MTC-IWF entity 1 may determine a charging policy applied to communication of the UE 3, which serves as a MTC device, based on the load information regarding either the GGSN/P-GW 57 or the S-GW 58 or both. The charging policy includes, for example, a charge for the use of MTC services (e.g., charge per device trigger, charge per unit volume of the user data of the UE 3).

The MTC-IWF entity 1 may predict a future load of the PLMN based on the load information regarding either the GGSN/P-GW 57 or the S-GW 58 or both. For example, the MTC-IWF entity 1 may statistically monitor and analyze the load information and determine a period of time in which the load of the GGSN/P-GW 57, the S-GW 58, and the like is relatively large or a period of time in which such load is relatively small. The future load of the PLMN may, for example, be used to adjust a communication timing of MTC services (e.g., to adjust a generation timing of a device trigger by the MTC application server 4).

The MTC-IWF entity 1 may create second load information indicating load status of the PLMN based on the load information (first load information) regarding either the GGSN/P-GW 57 or the S-GW 58 or both, and transmit the second load information to the MTC application server 4 through the SCS 2.

Figure 4:
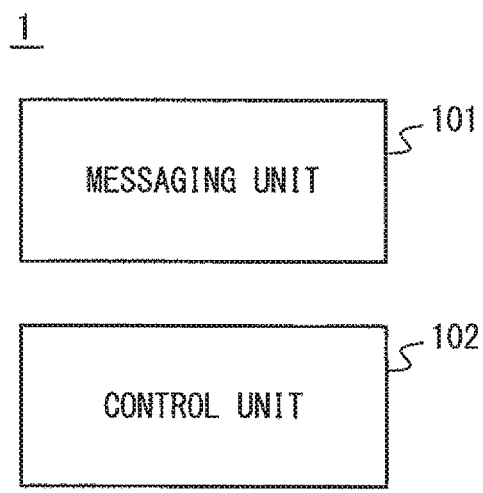
FIG. 4 is a block diagram showing a configuration example of the MTC-IWF entity according to the first embodiment.

FIG. 4 is a block diagram showing a configuration example of the MTC-IWF entity 1. In the example of FIG. 4, the MTC-IWF entity 1 includes a messaging unit 101 and a control unit 102. The messaging unit 101 operates to receive the load information regarding either the GGSN/P-GW 57 or the S-GW 58 or both through the signaling interface 11 between the MTC-IWF entity 1 and the GGSN/P-GW 57 or the signaling interface 12 between the MTC-IWF entity 1 and the S-GW 58. The control unit 102 operates to carry out processing related to an additional service (e.g., determination of the charging policy) as described above by using the load information regarding either the GGSN/P-GW 57 or the S-GW 58 or both.

Second Embodiment

Figure 5:
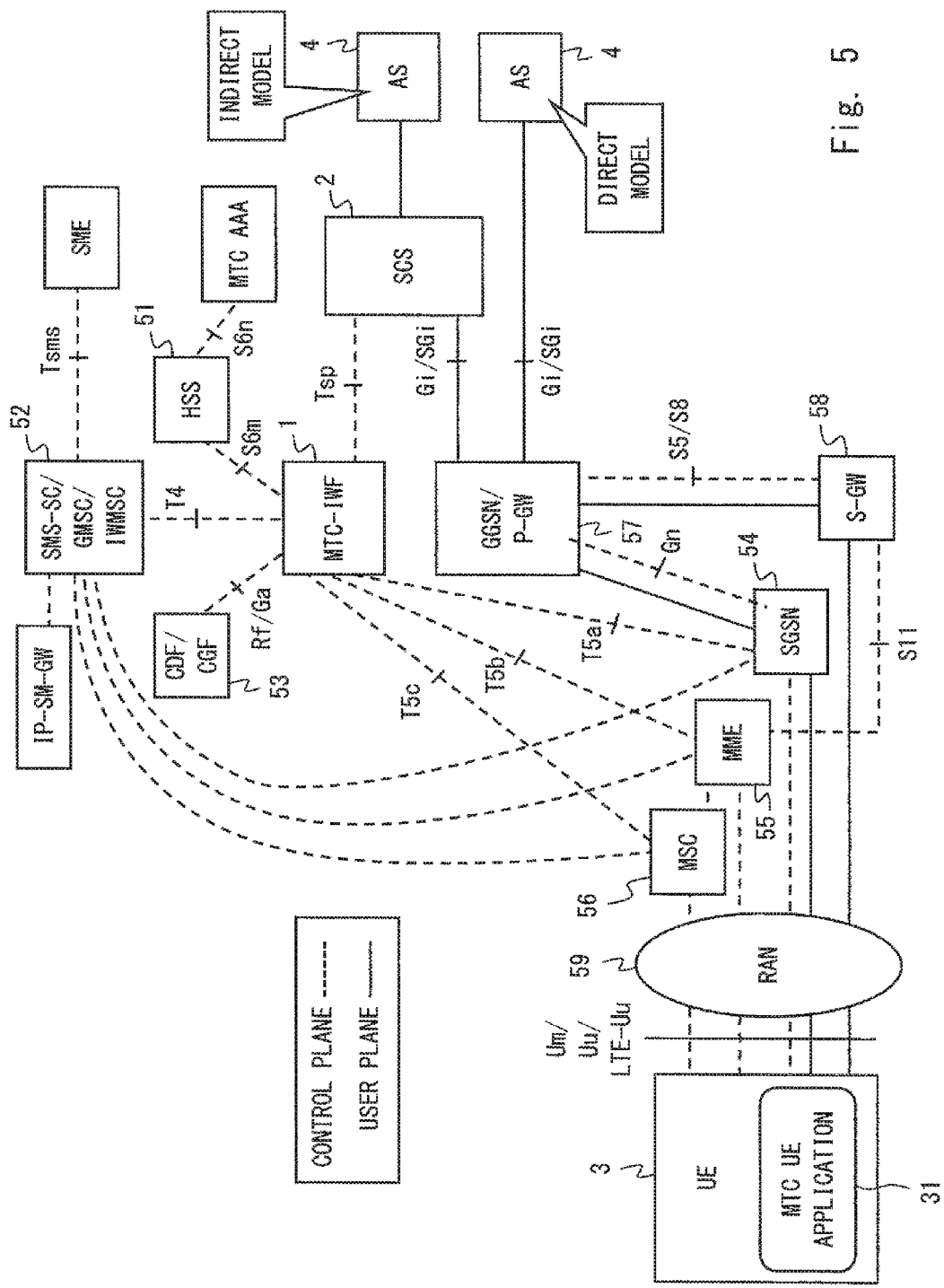
FIG. 5 is a diagram showing a radio communication system including a MTC-IWF entity according to a second embodiment that performs a procedure for obtaining load information regarding a PLMN.

In the embodiment, a modification of the first embodiment will be described. FIG. 5 is a diagram showing a configuration example of a radio communication system according to the embodiment. The radio communication system according to the embodiment is a 3GPP radio communication system, i.e., a UTMS or an EPS.

In the embodiment, the MTC-IWF entity 1 receives a control message containing load information from the SGSN 54 or the MME 55 through the signaling interface (i.e., T5*a* reference point or T5*b* reference point) between the MTC-IWF entity 1 and the SGSN 54 or the MME 55. The load information indicates load status of either the GGSN/P-GW 57 or the S-GW 58 or both. In order to transmit the load information regarding the GGSN to the MTC-IWF entity 1, the SGSN 54 may receive the load information regarding the GGSN from the GGSN (GGSN/P-GW 57) through an existing signaling interface (i.e., Gn reference point) between the SGSN 54 and the GGSN. Further, the MME 55 may receive the load information regarding either the S-GW or the P-GW or both from the S-GW 58 through an existing signaling interface (i.e., S11 reference point) between the MME 55 and the S-GW 58. In order to transmit the load information regarding the P-GW to the MTC-IWF entity 1, the S-GW 58 may receive the load information regarding the P-GW from the P-GW (GGSN/P-GW 57) through an existing signaling interface (i.e., S5/S8 reference point) between the S-GW 58 and the P-GW.

Figure 6:
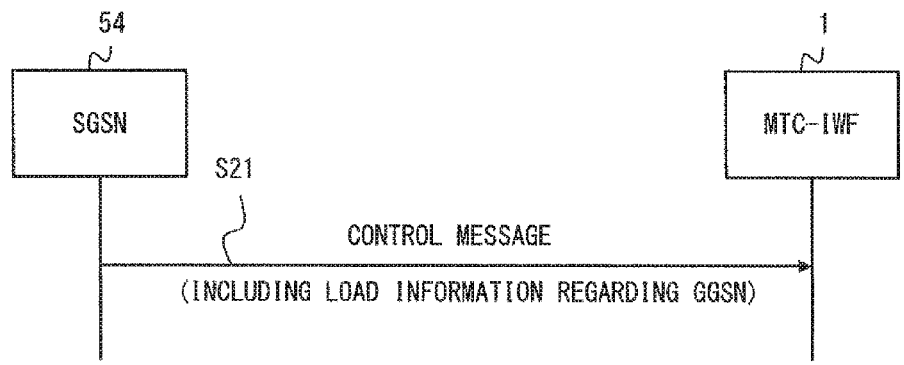
FIG. 6 is a sequence diagram showing an example of the procedure for obtaining the load information regarding the PLMN according to the second embodiment.

FIG. 6 is a sequence diagram showing the procedure for obtaining the load information regarding the GGSN in the MTC-IWF entity 1. In step S21, the SGSN 54 transmits a control message to the MTC-IWF entity 1 through the T5*a* reference point. This control message contains the load information regarding the GGSN (GGSN/P-GW 57).

Figure 7:
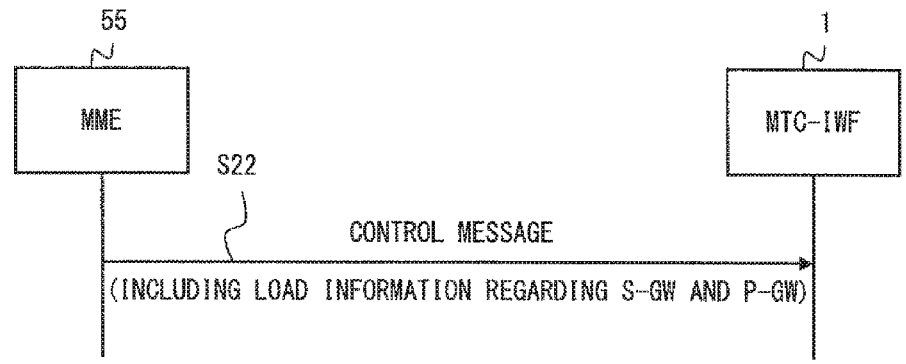
FIG. 7 is a sequence diagram showing an example of the procedure for obtaining the load information regarding the PLMN according to the second embodiment.

FIG. 7 is a sequence diagram showing the procedure for obtaining, by the MTC-IWF entity 1, the load information regarding either the P-GW (GGSN/P-GW 57) or the S-GW 58 or both. In step S22, the MME 55 transmits a control message to the MTC-IWF entity 1 through the T5*b* reference point. This control message contains the load information regarding either the P-GW (GGSN/P-GW 57) or the S-GW 58 or both.

In the embodiment, as in the first embodiment, the MTC-IWF entity 1 can receive the load information regarding either the GGSN/P-GW 57 or the S-GW 58 or both. Accordingly, the MTC-IWF entity 1 can use the load information regarding either the GGSN/P-GW 57 or the S-GW 58 or both. For example, the MTC-IWF entity 1 may use the load information regarding either the GGSN/P-GW 57 or the S-GW 58 or both to provide an additional service.

Third Embodiment

Figure 8:
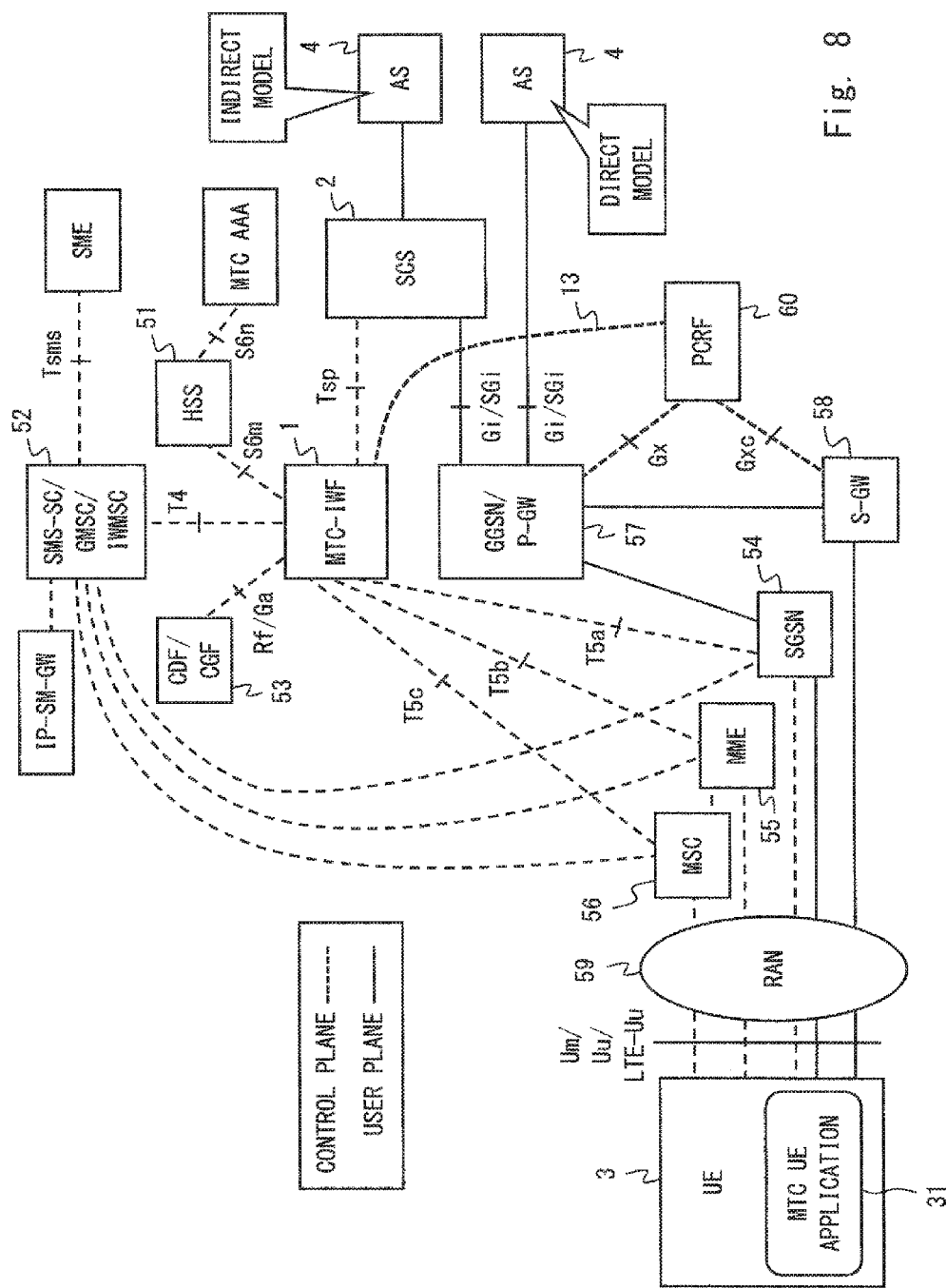
FIG. 8 is a diagram showing a radio communication system including a MTC-IWF entity according to a third embodiment that performs a procedure for obtaining load information regarding a PLMN.

In the embodiment, a modification of the first embodiment will be described. FIG. 8 is a diagram showing a configuration example of a radio communication system according to the embodiment. The radio communication system according to the embodiment is a 3GPP radio communication system, i.e., a UTMS or an EPS.

In the embodiment, the MTC-IWF entity 1 receives a control message containing load information from a PCRF 60 through a signaling interface (reference point) 13 between the PCRF 60 and the MTC-IWF entity 1. Here, the load information indicates load status of either the GGSN/P-GW 57 or the S-GW 58 or both. In order to transmit the load information regarding the GGSN/P-GW 57 to the MTC-IWF entity 1, the PCRF 60 may receive the load information regarding the GGSN/P-GW 57 from the GGSN/P-GW 57 through an existing signaling interface (i.e., Gx reference point) between the PCRF 60 and the GGSN/P-GW 57. Further, in order to transmit the load information regarding the S-GW 58 to the MTC-IWF entity 1, the PCRF 60 may receive the load information regarding the S-GW 58 from the S-GW 58 through an existing signaling interface (i.e., Gxc reference point) between the PCRF 60 and the S-GW 58.

Further or alternatively, the PCRF 60 may receive the load information regarding the GGSN/P-GW 57 from a Traffic Detection Function (TDF) (not illustrated) through a signaling interface (i.e., Sd reference point) between the PCRF 60 and the TDF. The TDF has a deep packet inspection function. The TDF receives an Application Detection and Control (ADC) rule from the PCRF 60 through the Sd reference point, executes deep packet inspection on user packets in accordance with the ADC rule, and detects the traffic of an application designated by the ADC rule. In addition, the TDF reports to the PCRF 60 the detection result of the application traffic through the Sd reference point. Accordingly, the TDF can detect the traffic amount for each application and can detect the load of the GGSN/P-GW 57 for each application.

The signaling interface 13 between the PCRF 60 and the MTC-IWF entity 1 may be an Rx reference point. The Rx reference point is an interface between the PCRF and an Application Function (AF). In this case, the PCRF 60 may receive service information on the application level from the MTC-IWF entity 1, determine a PCC rule, and supply the PCC rule to the GGSN/P-GW 57.

Figure 9:
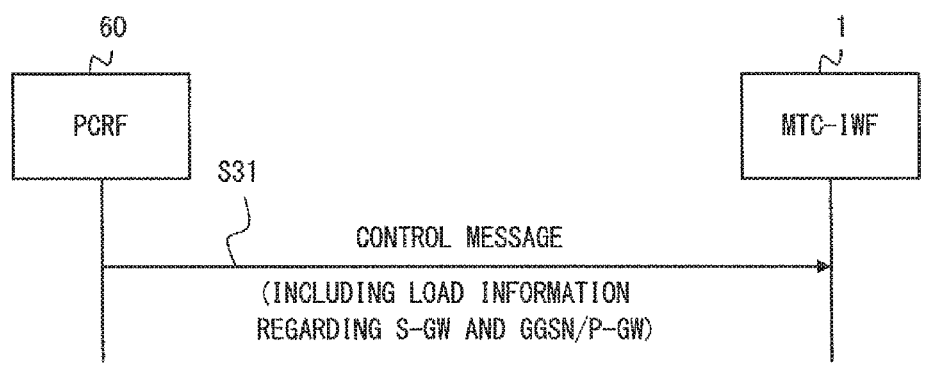
FIG. 9 is a sequence diagram showing an example of the procedure for obtaining the load information regarding the PLMN according to the third embodiment.

FIG. 9 is a sequence diagram showing the procedure for obtaining, by the MTC-IWF entity 1, the load information regarding either the GGSN/P-GW 57 or the S-GW 58 or both. In step S31, the PCRF 60 transmits a control message to the MTC-IWF entity 1 through the signaling interface 13. This control message contains the load information regarding either the GGSN/P-GW 57 or the S-GW 58 or both.

In the embodiment, as in the first embodiment, the MTC-IWF entity 1 can receive the load information regarding either the GGSN/P-GW 57 or the S-GW 58 or both. Accordingly, the MTC-IWF entity 1 can use the load information regarding either the GGSN/P-GW 57 or the S-GW 58 or both. For example, the MTC-IWF entity 1 may use the load information regarding either the GGSN/P-GW 57 or the S-GW 58 or both to provide an additional service.

Fourth Embodiment

Figure 10:
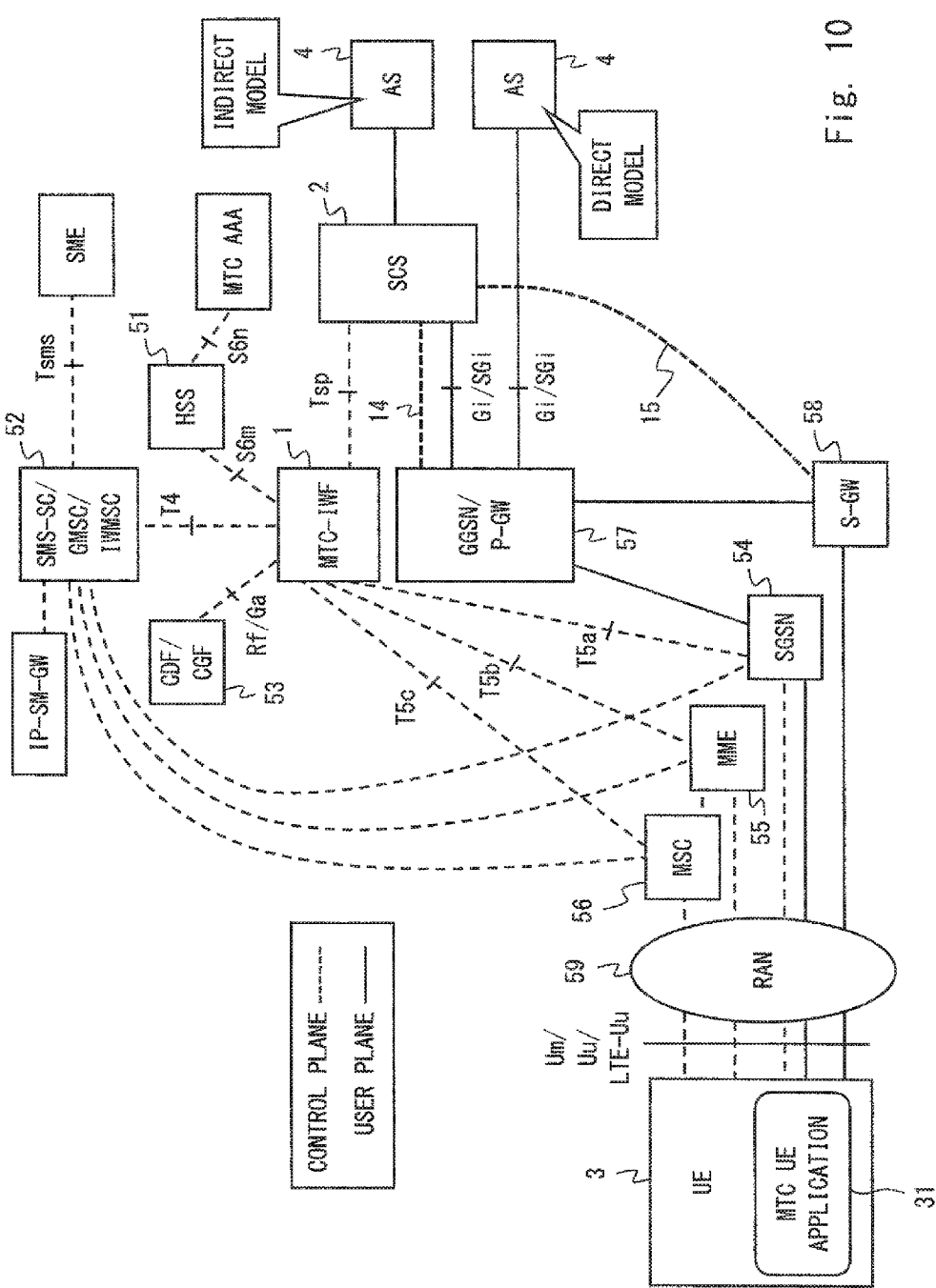
FIG. 10 is a diagram showing a radio communication system including an SCS entity according to a fourth embodiment that performs a procedure for obtaining load information regarding a PLMN.

In the embodiment, a modification of the first embodiment will be described. FIG. 10 is a diagram showing a configuration example of a radio communication system according to the embodiment. The radio communication system according to the embodiment is a 3GPP radio communication system, i.e., a UTMS or an EPS.

In the embodiment, in place of the MTC-IWF entity 1, the SCS 2 operates to receive load information regarding either the GGSN/P-GW 57 or the S-GW 58 or both. The SCS 2 according to the embodiment has a signaling interface (reference point) 14 with the GGSN/P-GW 57. In addition, the SCS 2 receives the load information regarding the GGSN or the P-GW from the GGSN/P-GW 57 through the signaling interface 13. The load information regarding the GGSN or the P-GW indicates load status of either the user plane or the control plane or both in the GGSN or the P-GW.

Figure 11:
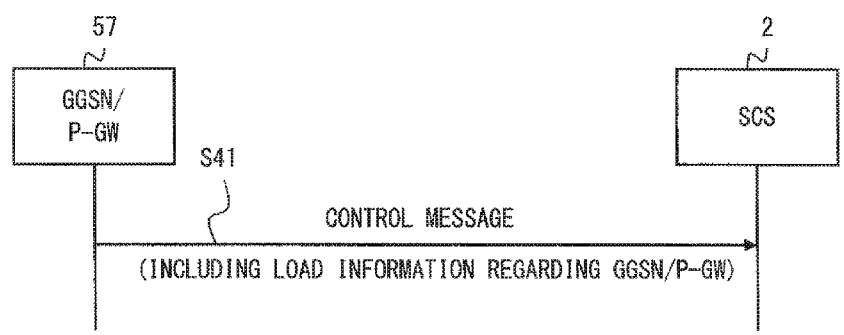
FIG. 11 is a sequence diagram showing an example of the procedure for obtaining the load information regarding the PLMN according to the fourth embodiment.

FIG. 11 is a sequence diagram showing the procedure for obtaining, by the SCS 2, the load information regarding the GGSN or the P-GW. In step S41, the GGSN/P-GW 57 transmits a control message to the SCS 2 through the signaling interface 14. This control message contains the load information regarding the GGSN or the P-GW.

Furthermore, in the example of FIG. 10, the SCS 2 has a signaling interface (reference point) 15 with the S-GW 58. The SCS 2 receives load information regarding the S-GW 58 from the S-GW 58 through the signaling interface 15. The load information regarding the S-GW 58 indicates load status of either the user plane or the control plane or both in the S-GW 58.

Figure 12:
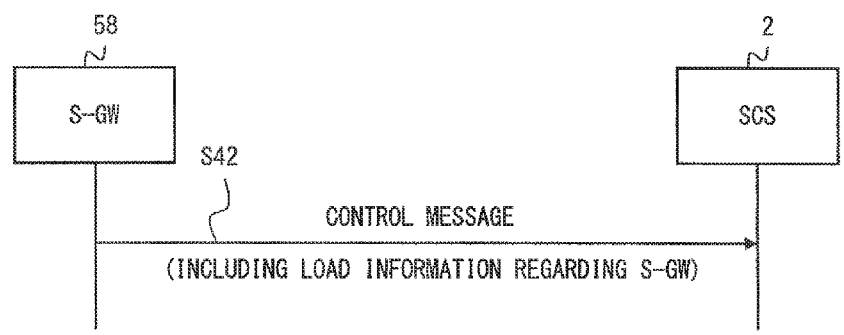
FIG. 12 is a sequence diagram showing an example of the procedure for obtaining the load information regarding the PLMN according to the fourth embodiment.

FIG. 12 is a sequence diagram showing the procedure for obtaining, by the SCS 2, the load information regarding the S-GW 58. In step S42, the S-GW 58 transmits a control message to the SCS 2 through the signaling interface 15. This control message contains the load information regarding the S-GW 58.

In the embodiment, the SCS 2 can receive the load information regarding either the GGSN/P-GW 57 or the S-GW 58 or both. Accordingly, the SCS 2 can use the load information regarding either the GGSN/P-GW 57 or the S-GW 58 or both. For example, the SCS 2 may use the load information regarding either the GGSN/P-GW 57 or the S-GW 58 or both to provide an additional service.

The SCS 2 may determine the charging policy applied to communication of the UE 3, which serves as the MTC device, based on the load information regarding either the GGSN/P-GW 57 or the S-GW 58 or both. Further or alternatively, the SCS 2 may predict a future load of the PLMN based on the load information regarding either the GGSN/P-GW 57 or the S-GW 58 or both. Further or alternatively, the SCS 2 may create second load information indicating load status of the PLMN based on the load information (first load information) regarding either the GGSN/P-GW 57 or the S-GW 58 or both, and transmit the second load information to the MTC application server 4.

The SCS 2 may transmit the load information regarding either the GGSN/P-GW 57 or the S-GW 58 or both to the MTC-IWF entity 1 through the signaling interface (i.e., Tsp reference point) with the MTC-IWF entity 1. Thus, the MTC-IWF entity 1 can use the load information regarding either the GGSN/P-GW 57 or the S-GW 58 or both.

Figure 13:
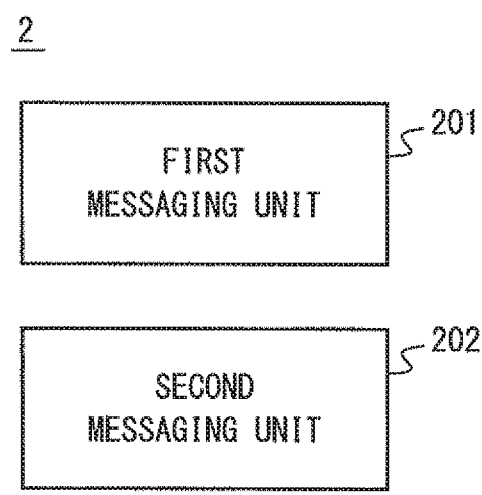
FIG. 13 is a block diagram showing a configuration example of the SCS according to the fourth embodiment.

FIG. 13 is a block diagram showing a configuration example of the SCS 2. In the example of FIG. 13, the SCS 2 includes a first messaging unit 201 and a second messaging unit 202. The first messaging unit 201 operates to communicate with the MTC-IWF entity 1 through the Tsp reference point. The second messaging unit 202 operates to receive the load information regarding either the GGSN/P-GW 57 or the S-GW 58 or both through the signaling interface 14 between the SCS 2 and the GGSN/P-GW 57 or through the signaling interface 15 between the SCS 2 and the S-GW 58. The first messaging unit 201 may transmit a control message that contains the load information regarding either the GGSN/P-GW 57 or the S-GW 58 or both to the MTC-IWF entity 1 through the Tsp reference point.

Fifth Embodiment

Figure 14:
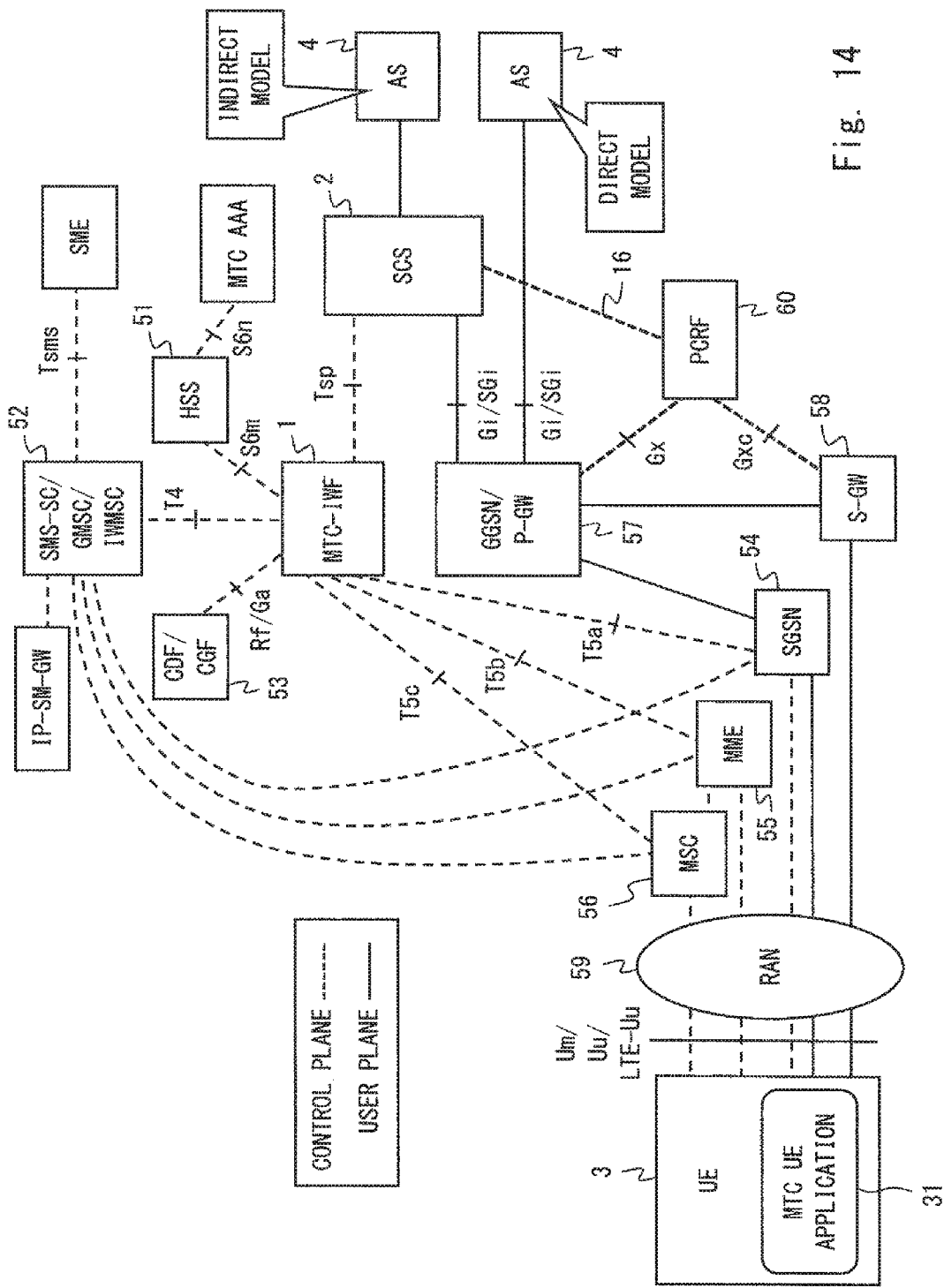
FIG. 14 is a diagram showing a radio communication system including an SCS entity according to a fifth embodiment that performs a procedure for obtaining load information regarding a PLMN.

In the embodiment, a modification of the third or fourth embodiment will be described. FIG. 14 is a diagram showing a configuration example of a radio communication system according to the embodiment. The radio communication system according to the embodiment is a 3GPP radio communication system, i.e., a UTMS or an EPS.

In the embodiment, as in the fourth embodiment, the SCS 2 operates to receive load information regarding either the GGSN/P-GW 57 or the S-GW 58 or both. This load information indicates load status of either the user plane or the control plane or both. Furthermore, the SCS 2 according to the embodiment has a signaling interface (reference point) 16 between the SCS 2 and the PCRF 60 and receives the aforementioned load information from the PCRF 60.

The signaling interface 16 between the PCRF 60 and the SCS 2 may be an Rx reference point. The Rx reference point is an interface between the PCRF and the Application Function (AF). As described in the third embodiment, the PCRF 60 may obtain the load information regarding either the GGSN/P-GW 57 or the S-GW 58 or both through any one or combination of the signaling interfaces with the GGSN/P-GW 57 (i.e., Gx reference point), with the S-GW 58 (i.e., Gxc reference point), and with the Traffic Detection Function (TDF) (i.e., Sd reference point).

Figure 15:
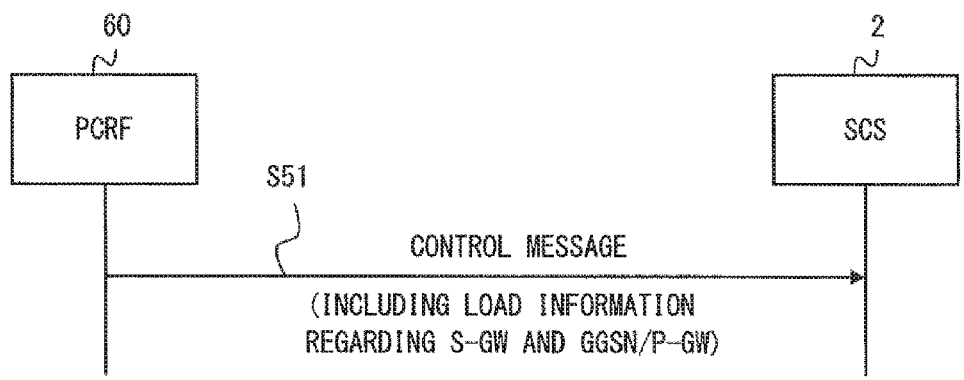
FIG. 15 is a sequence diagram showing an example of the procedure for obtaining the load information regarding the PLMN according to the fifth embodiment.

FIG. 15 is a sequence diagram showing the procedure for obtaining the load information regarding either the GGSN/P-GW 57 or the S-GW 58 or both in the SCS 2. In step S51, the PCRF 60 transmits a control message to the SCS 2 through the signaling interface 16. This control message contains the load information regarding either the GGSN/P-GW 57 or the S-GW 58 or both.

In the embodiment, as in the fourth embodiment, the SCS 2 can receive the load information regarding either the GGSN/P-GW 57 or the S-GW 58 or both. Accordingly, the SCS 2 can use the load information regarding either the GGSN/P-GW 57 or the S-GW 58 or both. For example, the SCS 2 may use the load information regarding either the GGSN/P-GW 57 or the S-GW 58 or both to provide an additional service.

The SCS 2 may send the load information regarding either the GGSN/P-GW 57 or the S-GW 58 or both to the MTC-IWF entity 1 through the signaling interface (i.e., Tsp reference point) between the SCS 2 and the MTC-IWF entity 1. Thus, the MTC-IWF entity 1 can use the load information regarding either the GGSN/P-GW 57 or the S-GW 58 or both.

Figure 16:
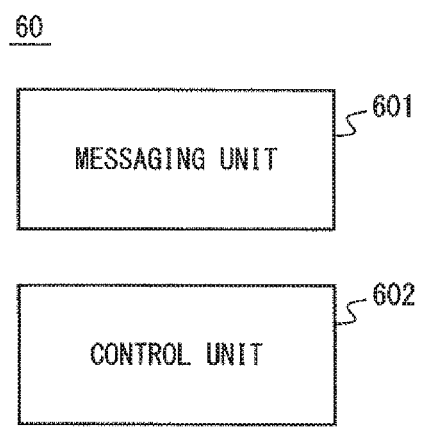
FIG. 16 is a block diagram showing a configuration example of a PCRF according to the fourth embodiment.

FIG. 16 is a block diagram showing a configuration example of the PCRF 60. In the example of FIG. 16, the PCRF 60 includes a messaging unit 601 and a control unit 602. The control unit 602 operates to supply a PCC rule to the GGSN/P-GW 57 serving as a PCEF. The messaging unit 601 operates to transmit the load information regarding either the GGSN/P-GW 57 or the S-GW 58 or both to the SCS 2 through the signaling interface 16 between the PCRF 60 and the SCS 2.

The PCRF 60 according to the embodiment described above may operate to transmit, to the application server 4 instead of the SCS 2, the load information regarding either the GGSN/P-GW 57 or the S-GW 58 or both.

Sixth Embodiment

Figure 17:
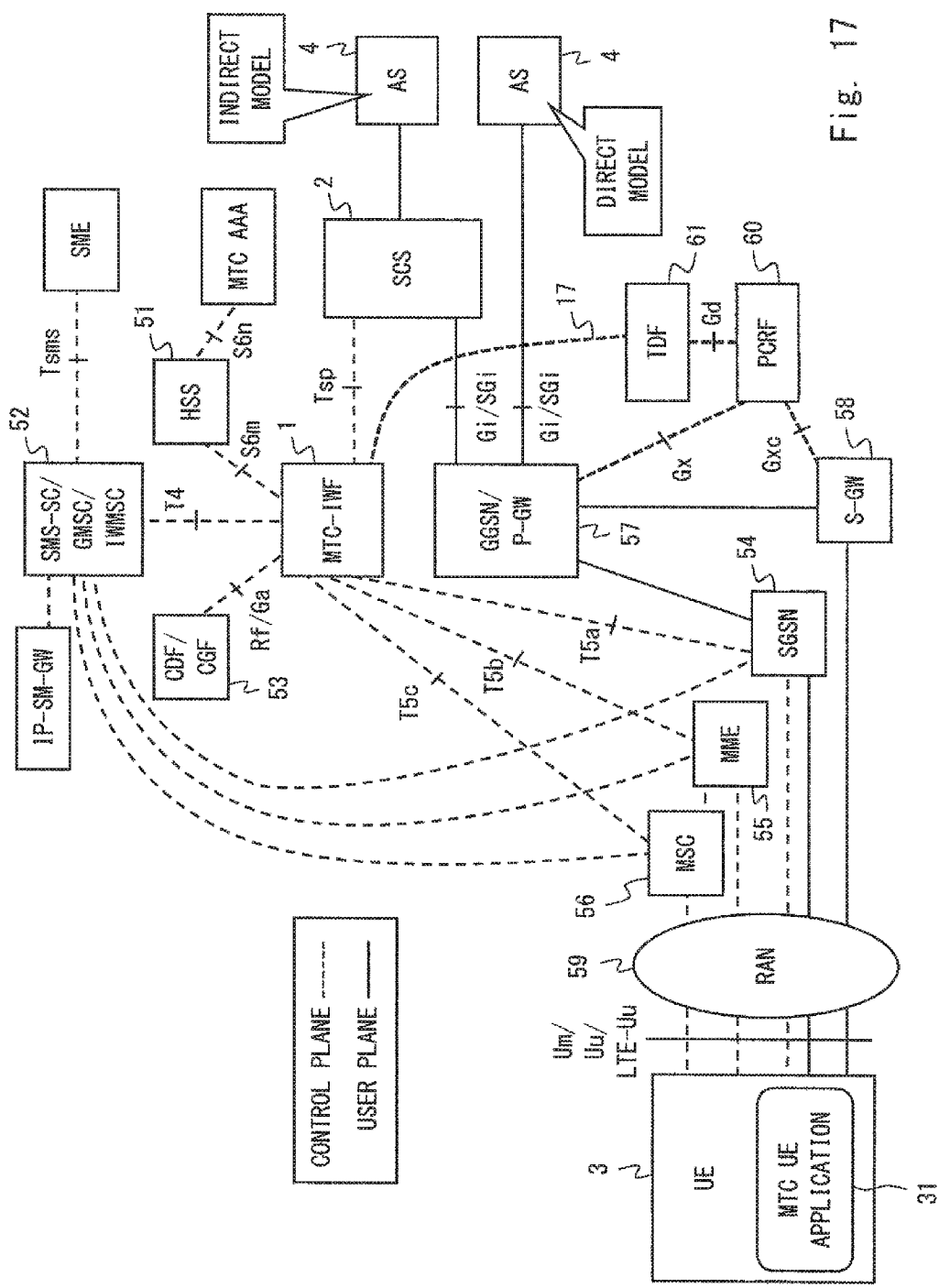
FIG. 17 is a diagram showing a radio communication system including a MTC-IWF entity according to a sixth embodiment that performs a procedure for obtaining load information regarding a PLMN.

In the embodiment, a modification of the first to third embodiments will be described. FIG. 17 is a diagram showing a configuration example of a radio communication system according to the embodiment. The radio communication system according to the embodiment is a 3GPP radio communication system, i.e., a UTMS or an EPS.

In the embodiment, the MTC-IWF entity 1 receives a control message including load information from a Traffic Detection Function (TDF) 61 through a signaling interface (reference point) 17 between the TDF 61 and the MTC-IWF entity 1. The load information is load information regarding the user plane of the PLMN, and indicates load status of either the GGSN/P-GW 57 or the S-GW 58 or both.

As has already been described, the TDF 61 has a deep packet inspection function. The TDF 61 receives the Application Detection and Control (ADC) rule from the PCRF 60 through the Sd reference point, executes the deep packet inspection on a user packet in accordance with the ADC rule, and detects the traffic of an application (in other words, packet flow or IP-CAN session) designated by the ADC rule. Accordingly, the TDF 61 can detect the traffic amount for each application and can detect the load of the GGSN/P-GW 57 for each application. Furthermore, the TDF 61 of the embodiment reports to the MTC-IWF entity 1 the detection result of the traffic amount for each application (or the load of the GGSN/P-GW 57 for each application) through the signaling interface 17.

Figure 18:
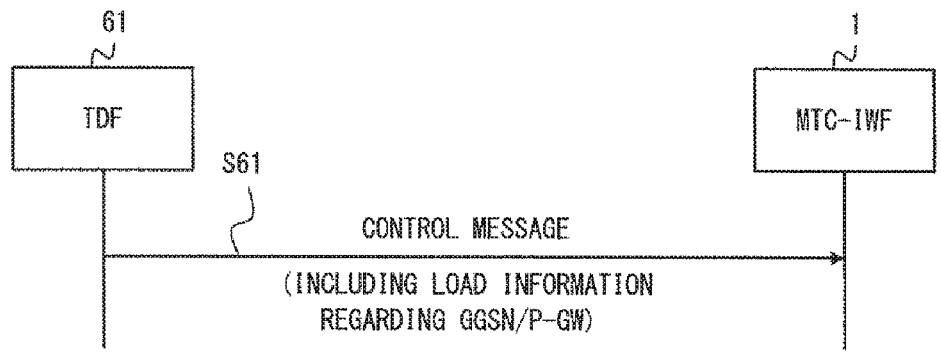
FIG. 18 is a sequence diagram showing an example of the procedure for obtaining the load information regarding the PLMN according to the sixth embodiment.

FIG. 18 is a sequence diagram showing the procedure for obtaining, by the MTC-IWF entity 1, the load information regarding the user plane of the PLMN detected by the TDF 61. In step S61, the TDF 61 transmits a control message to the MTC-IWF entity 1 through the signaling interface 17. This control message contains the load information regarding the user plane of the PLMN, or in other words, the load information regarding either the GGSN/P-GW 57 or the S-GW 58 or both.

In the embodiment, as in the first to third embodiments, the MTC-IWF entity 1 can receive the load information regarding either the GGSN/P-GW 57 or the S-GW 58 or both. Accordingly, the MTC-IWF entity 1 can use the load information regarding either the GGSN/P-GW 57 or the S-GW 58 or both. For example, the MTC-IWF entity 1 may use the load information regarding either the GGSN/P-GW 57 or the S-GW 58 or both to provide an additional service.

Seventh Embodiment

The configuration example of a wireless communication system according to the embodiment may, for example, be similar to that of FIG. 5. In the embodiment, the MTC-IWF entity 1 operates to receive load information regarding the SGSN 54 or the MME 55 from the SGSN 54 or the MME 55. Here, the load information regarding the SGSN 54 or the MME 55 indicates load status of the control processing in the SGSN 54 or the MME 55 serving as a control-plane node. The load information regarding the SGSN 54 or the MME 55 indicates, for example, the number of the entire control messages processed, the number of processed attach requests from the UE 3, the number of processed bearer establishment requests (or bearer context activation requests) from the UE 3, or the number of currently retained bearer contexts.

Specifically, the MTC-IWF entity 1 may receive a control message containing the load information regarding the SGSN 54 from the SGSN 54 through the signaling interface (i.e., T5a reference point) between the SGSN 54 and the MTC-IWF entity 1. Further or alternatively, the MTC-IWF entity 1 may receive a control message containing the load information regarding the MME 55 from the MME 55 through the signaling interface (i.e., T5b reference point) between the MME 55 and the MTC-IWF entity 1.

Figure 19:
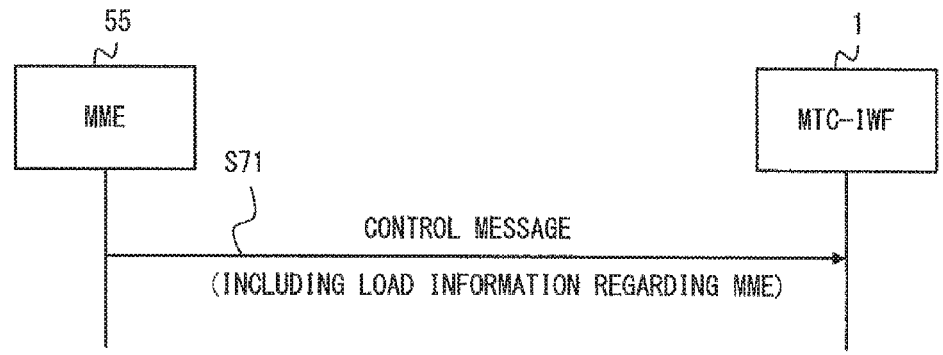
FIG. 19 is a sequence diagram showing an example of a procedure for obtaining load information regarding a PLMN according to a seventh embodiment.

FIG. 19 is a sequence diagram showing the procedure for obtaining, by the MTC-IWF entity 1, the load information regarding the MME 55. In step S71, the MME 55 transmits a control message to the MTC-IWF entity 1 through the T5b reference point. This control message contains the load information regarding the MME 55.

The configuration example of the MTC-IWF 1 according to the embodiment may be similar to that of FIG. 4.

In the embodiment, the MTC-IWF entity 1 can receive the load information regarding the SGSN 54 or the MME 55 serving as a control plane node. Accordingly, the MTC-IWF entity 1 can use the load information regarding the SGSN 54 or the MME 55. For example, the MTC-IWF entity 1 may use the load information regarding the SGSN 54 or the MME 55 to provide an additional service similar to that described in the first embodiment in relation to the use of the load information regarding the GGSN/P-GW 57 or the S-GW 58.

Other Embodiments

The plurality of embodiments stated above may be combined as appropriate.

The processing performed by the MTC-IWF entity 1, the SCS 2, the MTC application server 4, the SGSN 54, the MME 55, GGSN/P-GW 57, S-GW 58, PCRF 60, and the UE 3 may be implemented by causing a computer system to execute a program. To be more specific, a computer system may be supplied with one or more programs including instructions to cause the computer system to perform algorithms described in this description using the sequence diagrams and the like.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, the embodiments stated above are merely examples regarding applications of technical ideas obtained by the present inventor. Needless to say, these technical ideas are not limited to the embodiments described above and various modifications can be performed on these technical ideas.

For example, the whole or part of the embodiments disclosed above can be described as, but not limited to, the following supplementary notes.

(Supplementary Note A1)

A Machine Type Communication Inter Working Function (MTC-IWF) entity arranged in a mobile core network, the MTC-IWF entity including:

a messaging unit configured to receive a control message including first load information from a Gateway General Packet Radio Service Support Node (GGSN), a Serving Gateway (S-GW), or a Packet Data Network Gateway (P-GW) through a signaling interface between the MTC-IWF entity and the GGSN, the S-GW, or the P-GW, in which the first load information indicates a load status of a user plane or a control plane in the GGSN, the S-GW, or the P-GW.

(Supplementary Note A2)

The MTC-IWF entity according to Supplementary Note A1, further including a first control unit configured to determine, based on the first load information, a charging policy applied to communication of a Machine Type Communication (MTC) device.

(Supplementary Note A3)

The MTC-IWF entity according to Supplementary Notes A1 or A2, further including a second control unit configured to predict a future network load based on the first load information.

(Supplementary Note A4)

The MTC-IWF entity according to any one of Supplementary Notes A1 to A3, further including a third control unit configured to create, based on the first load information, second load information indicating a load status of the mobile core network and to transmit the second load information to an application server through a Service Capability Server (SCS).

(Supplementary Note A5)

A communication method including:

receiving, by a Machine Type Communication Inter Working Function (MTC-IWF) entity, a control message including first load information from a Gateway General Packet Radio Service Support Node (GGSN), a Serving Gateway (S-GW), or a Packet Data Network Gateway (P-GW) through a signaling interface between the MTC-IWF entity and the GGSN, the S-GW, or the P-GW, in which the first load information indicates a load status of a user plane or a control plane in the GGSN, the S-GW, or the P-GW.

(Supplementary Note A6)

The communication method according to Supplementary Note A5, further including determining, based on the first load information, a charging policy applied to communication of a Machine Type Communication (MTC) device.

(Supplementary Note A7)

The communication method according to Supplementary Note A5 or A6, further including predicting a future network load based on the first load information.

(Supplementary Note A8)

The communication method according to any one of Supplementary Notes A5 to A7, further including:

creating, based on the first load information, second load information indicating a load status of the mobile core network; and transmitting the second load information from the MTC-IWF entity to an application server through a Service Capability Server (SCS).

(Supplementary Note A9)

A non-transitory computer readable medium storing a program for causing a computer to perform a communication method, in which the communication method includes receiving, by a Machine Type Communication Inter Working Function (MTC-IWF) entity, a control message including first load information from a Gateway General Packet Radio Service Support Node (GGSN), a Serving Gateway (S-GW), or a Packet Data Network Gateway (P-GW) through a signaling interface between the MTC-IWF entity and the GGSN, the S-GW, or the P-GW, and the first load information indicates a load status of a user plane or a control plane in the GGSN, the S-GW, or the P-GW.

(Supplementary Note B1)

A Machine Type Communication Inter Working Function (MTC-IWF) entity arranged in a mobile core network, the MTC-IWF entity including:

a messaging unit configured to receive a control message including first load information from a Serving General Packet Radio Service Support Node (SGSN) or a Mobility Management Entity (MME) through a signaling interface between the MTC-IWF entity and the SGSN or the MME, in which the first load information indicates a load status of a user plane or a control plane in a Gateway General Packet Radio Service Support Node (GGSN), a Serving Gateway (S-GW), or a Packet Data Network Gateway (P-GW).

(Supplementary Note B2)

The MTC-IWF entity according to Supplementary Note B1, further including a first control unit configured to determine, based on the first load information, a charging policy applied to communication of a Machine Type Communication (MTC) device.

(Supplementary Note B3)

The MTC-IWF entity according to Supplementary Notes B1 or B2, further including a second control unit configured to predict a future network load based on the first load information.

(Supplementary Note B4)

The MTC-IWF entity according to any one of Supplementary Notes B1 to B3, further including a third control unit configured to create, based on the first load information, second load information indicating a load status of the mobile core network and to transmit the second load information to an application server through a Service Capability Server (SCS).

(Supplementary Note B5)

The MTC-IWF entity according to any one of Supplementary Notes B1 to B4, in which the signaling interface is a T5a interface or a T5b interface.

(Supplementary Note B6)

A communication method including:

receiving, by a Machine Type Communication Inter Working Function (MTC-IWF) entity, a control message including first load information from a Serving General Packet Radio Service Support Node (SGSN) or a Mobility Management Entity (MME) through a signaling interface between the MTC-IWF entity and the SGSN or the MME, in which the first load information indicates a load status of a user plane or a control plane in a Gateway General Packet Radio Service Support Node (GGSN), a Serving Gateway (S-GW), or a Packet Data Network Gateway (P-GW).

(Supplementary Note B7)

The communication method according to Supplementary Note B6, further including determining, based on the first load information, a charging policy applied to communication of a Machine Type Communication (MTC) device.

(Supplementary Note B8)

The communication method according to Supplementary Note B6 or B7, further including predicting a future network load based on the first load information.

(Supplementary Note B9)

The communication method according to any one of Supplementary Notes B6 to B8, further including:

creating, based on the first load information, second load information indicating a load status of the mobile core network; and transmitting the second load information from the MTC-IWF entity to an application server through a Service Capability Server (SCS).

(Supplementary Note B10)

A non-transitory computer readable medium storing a program for causing a computer to perform a communication method, in which the communication method includes receiving, by a Machine Type Communication Inter Working Function (MTC-IWF) entity, a control message including first load information from a Serving General Packet Radio Service Support Node (SGSN) or a Mobility Management Entity (MME) through a signaling interface between the MTC-IWF entity and the SGSN or the MME, and the first load information indicates a load status of a user plane or a control plane in a Gateway General Packet Radio Service Support Node (GGSN), a Serving Gateway (S-GW), or a Packet Data Network Gateway (P-GW).

(Supplementary Note C1)

A Service Capability Server (SCS) entity including:

a first messaging unit configured to communicate with a Machine type Communication Inter Working Function (MTC-IWF) entity through a first signaling interface between the MTC-IWF and the SCS entity; and a second messaging unit configured to receive a control message including first load information from a Gateway General Packet Radio Service Support Node (GGSN), a Serving Gateway (S-GW), or a Packet Data Network Gateway (P-GW) through a second signaling interface between the SCS entity and the GGSN, the S-GW, or the P-GW, in which the load information indicates a load status of a user plane or a control plane in the GGSN, the S-GW, or the P-GW.

(Supplementary Note C2)

The SCS entity according to Supplementary Note C1, in which the first messaging unit transmits a control message including the first load information to the MTC-IWF entity through the first signaling interface.

(Supplementary Note C3)

A communication method including:

communicating, by a Service Capability Server (SCS) entity, with a Machine type Communication Inter Working Function (MTC-IWF) entity through a first signaling interface between the MTC-IWF and the SCS entity; and receiving, by the SCS entity, a control message including first load information from a Gateway General Packet Radio Service Support Node (GGSN), a Serving Gateway (S-GW), or a Packet Data Network Gateway (P-GW) through a second signaling interface between the SCS entity and the GGSN, the S-GW, or the P-GW, in which the load information indicates a load status of a user plane or a control plane in the GGSN, the S-GW, or the P-GW.

(Supplementary Note C4)

The communication method according to Supplementary Note C3, further including transmitting a control message including the first load information to the MTC-IWF entity through the first signaling interface.

(Supplementary Note C5)

A non-transitory computer readable medium storing a program for causing a computer to perform a communication method, in which the communication method includes:

communicating, by a Service Capability Server (SCS) entity, with a Machine type Communication Inter Working Function (MTC-IWF) entity through a first signaling interface between the MTC-IWF and the SCS entity; and receiving, by the SCS entity, a control message including first load information from a Gateway General Packet Radio Service Support Node (GGSN), a Serving Gateway (S-GW), or a Packet Data Network Gateway (P-GW) through a second signaling interface between the SCS entity and the GGSN, the S-GW, or the P-GW, and the load information indicates a load status of a user plane or a control plane in the GGSN, the S-GW, or the P-GW.

(Supplementary Note D1)

A Machine Type Communication Inter Working Function (MTC-IWF) entity arranged in a mobile core network, the MTC-IWF entity including:

a messaging unit configured to receive a control message including first load information from a Serving General Packet Radio Service Support Node (SGSN) or a Mobility Management Entity (MME) through a signaling interface between the MTC-IWF entity and the SGSN or the MME, in which the first load information indicates a load status of the SGSN or the MME.

(Supplementary Note D2)
The MTC-IWF entity according to Supplementary Note D1, in which the signaling interface is a T5a interface or a T5b interface.

(Supplementary Note D3)
A communication method including:
receiving, by a Machine Type Communication Inter Working Function (MTC-IWF) entity, a control message including first load information from a Serving General Packet Radio Service Support Node (SGSN) or a Mobility Management Entity (MME) through a signaling interface between the MTC-IWF entity and the SGSN or the MME, in which
the first load information indicates a load status of the SGSN or the MME.

(Supplementary Note D4)
A non-transitory computer readable medium storing a program for causing a computer to perform a communication method, in which
the communication method includes receiving, by a Machine Type Communication Inter Working Function (MTC-IWF) entity, a control message including first load information from a Serving General Packet Radio Service Support Node (SGSN) or a Mobility Management Entity (MME) through a signaling interface between the MTC-IWF entity and the SGSN or the MME, and
the first load information indicates a load status of the SGSN or the MME.

(Supplementary Note E1)
A Machine Type Communication Inter Working Function (MTC-IWF) entity arranged in a mobile core network, the MTC-IWF entity including:
a messaging unit configured to receive a control message including first load information from a Traffic Detection Function (TDF) through a signaling interface between the TDF and the MTC-IWF entity, in which
the first load information indicates a load status of a user plane or a control plane in a Gateway General Packet Radio Service Support Node (GGSN), a Serving Gateway (S-GW), or a Packet Data Network Gateway (P-GW).

(Supplementary Note E2)
A communication method including:
receiving, by a Machine Type Communication Inter Working Function (MTC-IWF) entity, a control message including first load information from a Traffic Detection Function (TDF) through a signaling interface between the TDF and the MTC-IWF entity, in which
the first load information indicates a load status of a user plane or a control plane in a Gateway General Packet Radio Service Support Node (GGSN), a Serving Gateway (S-GW), or a Packet Data Network Gateway (P-GW).

(Supplementary Note E3)
A non-transitory computer readable medium storing a program for causing a computer to perform a communication method, in which
the communication method includes receiving, by a Machine Type Communication Inter Working Function (MTC-IWF) entity, a control message including first load information from a Traffic Detection Function (TDF) through a signaling interface between the TDF and the MTC-IWF entity, and
the first load information indicates a load status of a user plane or a control plane in a Gateway General Packet Radio Service Support Node (GGSN), a Serving Gateway (S-GW), or a Packet Data Network Gateway (P-GW).

This application is based upon and claims the benefit of priority from Japanese Patent Application No. 2013-172653, filed on Aug. 22, 2013, and the disclosure of which is incorporated herein in its entirety by reference.

REFERENCE SIGNS LIST

1 MACHINE TYPE COMMUNICATION INTER WORKING FUNCTION (MTC-IWF) ENTITY
2 SERVICE CAPABILITY SERVER (SCS)
3 USER EQUIPMENT (UE)
4 MTC APPLICATION SERVER
11 to 17 SIGNALING INTERFACE (REFERENCE POINT)
31 MTC UE APPLICATION
51 HOME SUBSCRIBER SERVER (HSS)
52 SHORT MESSAGE SERVICE-SERVICE CENTER (SMS-SC)
53 CHARGING DATA FUNCTION (CDF)/CHARGING GATEWAY FUNCTION (CGF)
54 SERVING GENERAL PACKET RADIO SERVICE (GPRS) SUPPORT NODE (SGSN)
55 MOBILITY MANAGEMENT ENTITY (MME)
56 MOBILE SWITCHING CENTER (MSC)
57 GATEWAY GPRS SUPPORT NODE/PACKET DATA NETWORK GATEWAY (GGSN/P-GW)
58 SERVING GATEWAY (S-GW)
59 RADIO ACCESS NETWORK (RAN)
60 POLICY AND CHARGING RULE FUNCTION (PCRF)
61 TRAFFIC DETECTION FUNCTION (TDF)
101 MESSAGING UNIT
102 CONTROL UNIT
201 FIRST MESSAGING UNIT
202 SECOND MESSAGING UNIT

The invention claimed is:
1. An entity arranged in a mobile network, the entity comprising:
at least one hardware processor configured to execute modules comprising:
a messenger configured to receive a control message including first load information from a Policy and Charging Rule Function (PCRF) through a signaling interface between the PCRF and the entity, the first load information indicating a load status of a user plane or a control plane in a Gateway General Packet Radio Service Support Node (GGSN), a Serving Gateway (S-GW), or a Packet Data Network Gateway (P-GW); and
a first controller configured to create, based on the first load information, second load information indicating a load status of the mobile network and to transmit the second load information to an application server through a Service Capability Server (SCS).

2. The entity according to claim 1, wherein the modules further comprises a second controller configured to determine, based on the first load information, a charging policy applied to communication of a Machine Type Communication (MTC) device.

3. The entity according to claim 1, wherein the modules further comprises a third controller configured to predict a future network load based on the first load information.

4. A communication method comprising:
receiving, by an entity arranged in a mobile network, a control message including first load information from a Policy and Charging Rule Function (PCRF) through a signaling interface between the PCRF and the entity, the first load information indicating a load status of a user plane or a control plane in a Gateway General Packet Radio Service Support Node (GGSN), a Serving Gateway (S-GW), or a Packet Data Network Gateway (P-GW);

creating, based on the first load information, second load information indicating a load status of the mobile network; and transmitting the second load information from the entity to an application server through a Service Capability Server (SCS).

5. The communication method according to claim 4, further comprising determining, based on the first load information, a charging policy applied to communication of a Machine Type Communication (MTC) device.

6. The communication method according to claim 4, further comprising predicting a future network load based on the first load information.

7. A non-transitory computer readable medium storing a program for causing a computer to perform a communication method,
wherein the communication method comprises:

receiving, by an entity arranged in a mobile network, a control message including first load information from a Policy and Charging Rule Function (PCRF) through a signaling interface between the PCRF and the entity, the first load information indicating a load status of a user plane or a control plane in a Gateway General Packet Radio Service Support Node (GGSN)' a Serving Gateway (S-GW), or a Packet Data Network Gateway (P-GW);

creating, based on the first load information, second load information indicating a load status of the mobile network; and transmitting the second load information from the entity to an application server through a Service Capability Server (SCS).

\* \* \* \* \*

UNITED STATES PATENT AND TRADEMARK OFFICE
CERTIFICATE OF CORRECTION

PATENT NO. : 9,980,172 B2
APPLICATION NO. : 14/912944
DATED : May 22, 2018
INVENTOR(S) : Takanori Iwai It is certified that error appears in the above-identified patent and that said Letters Patent is hereby corrected as shown below:

In the Claims

Column 22, Claim 7, Line 8; "(GGSN)'" has been replaced with --(GGSN),-- therefor Signed and Sealed this
Fifth Day of February, 2019

Andrei Iancu
*Director of the United States Patent and Trademark Office*